United States Patent
Zuccato

[11] Patent Number: 5,774,969
[45] Date of Patent: Jul. 7, 1998

[54] MODULAR MODEL VEHICLE ASSEMBLY

[76] Inventor: Giuliano Zuccato, 38571 Northfarm Dr., Northville, Mich. 48167

[21] Appl. No.: 597,020

[22] Filed: Feb. 5, 1996

[51] Int. Cl.$^6$ .................. B23P 19/04; B23Q 27/00
[52] U.S. Cl. .................. 29/407.05; 29/460; 29/557; 29/426.1; 409/132; 409/133
[58] Field of Search .................. 29/897.2, 407.05, 29/460, 557, 527.2, 426.1; 409/132, 131, 80, 133

[56] References Cited

U.S. PATENT DOCUMENTS

| | | | |
|---|---|---|---|
| 4,555,836 | 12/1985 | Martin | 29/460 |
| 4,976,019 | 12/1990 | Kitamura | 409/133 |
| 5,027,496 | 7/1991 | Zuccato | 29/460 |
| 5,480,208 | 1/1996 | Cobes et al. | 29/897.2 |
| 5,493,767 | 2/1996 | Suonjara | 409/132 |
| 5,586,391 | 12/1996 | Micale | 29/897.2 |
| 5,615,483 | 4/1997 | Micale et al. | 29/897.2 |

FOREIGN PATENT DOCUMENTS

| 4220565 | 3/1994 | Japan | 29/897.2 |
|---|---|---|---|

Primary Examiner—S. Thomas Hughes
Assistant Examiner—Tisa Stewart
Attorney, Agent, or Firm—Howard & Howard

[57] ABSTRACT

A modular vehicle includes a plurality of modular members arranged on a base. The modular members collectively approximate the contour of a vehicle interior or exterior. The modular members are arranged on the base in a close fitting, removable fashion. Each of the modular members has a contoured surface which closely approximates a corresponding portion of a contour of a vehicle interior or exterior. The model vehicle can be reconfigured by simply removing the modular members affected by a design change, reconfiguring the removed modular members and replacing the removed modular members. In another feature, the model vehicle assembly includes a plurality of floor section modular members, wherein one of these floor modular members has a hole defining a reference point. A digitizer which measures the contour of the interior is mounted in the hole. A method of assembling a model for a vehicle is also disclosed.

6 Claims, 3 Drawing Sheets

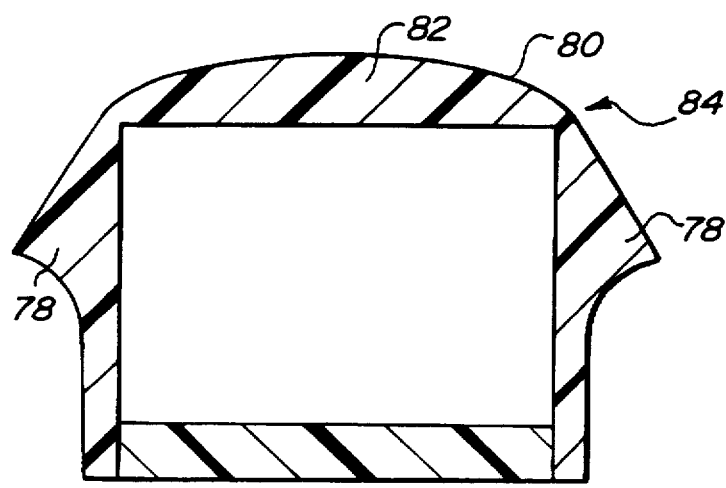
_Fig-6_
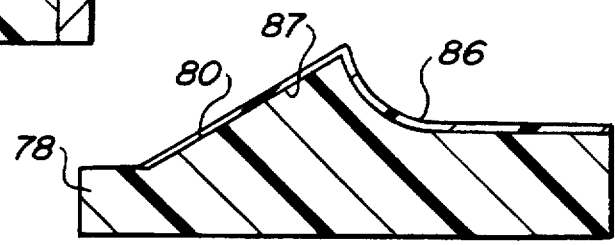
_Fig-7_
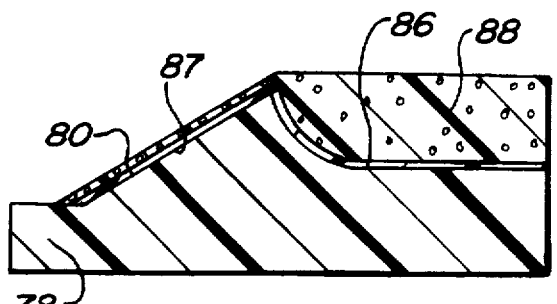
_Fig-8_
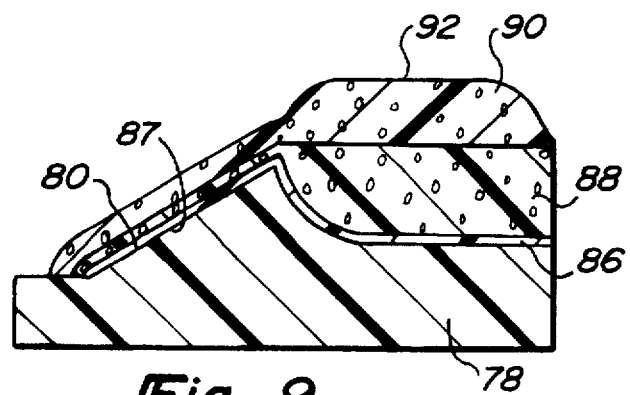
_Fig-9_
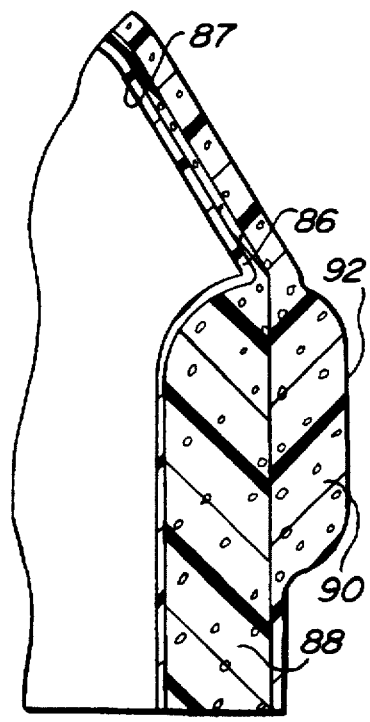
_Fig-10_

MODULAR MODEL VEHICLE ASSEMBLY

BACKGROUND OF THE INVENTION

The present invention generally relates to a modular system for constructing a model vehicle. The model vehicle comprises a plurality of detachable modular members which collectively approximate the contour of the interior and/or exterior of a vehicle.

During the design phase of a vehicle, several models of the vehicle are constructed which assist designers in designing the interior or exterior of the vehicle. The models have typically been made of a unitary piece of plastic. The model attempts to provide an approximation of the interior or exterior surface of the vehicle. In fact, there are deficiencies in the prior art methods, as they have not always provided close approximation of the design of the interior. More importantly the prior art models are very expensive and time consuming to build or modify.

For example, the designers typically build a "seating buck" which approximates the actual design dimensions of the vehicle interior. The designer can then place the seats, steering column and steering wheel, within the model and test whether the design dimensions of the interior accommodate these components for maximum comfort and utility.

Prior art seating bucks do not facilitate changes in the contour of a vehicle interior or exterior. Thus, if the designers decide to change the contour of the vehicle interior or exterior, it is quite difficult and time consuming. Moreover, it has been difficult to accurately represent the design modification on the part. The designer cannot be sure that the modification is fully acceptable until the new seating buck is made and reconstructed. This represents a significant waste of resources and time.

One other type of vehicle model is a "body-in-white". This is a model of the vehicle exterior and interior. The problems listed above also apply to models-in-white.

Digitizers are also well known in the design field of automotive manufacturing. In one application, digitizers measure the contour of a vehicle interior and transfer this information to a computer. When used on a seating buck, the digitizer allows the designer to check the accuracy of the interior dimensions of the seating buck. In the prior art, digitizers must be manually swept along the surface of the vehicle interior or exterior to record the measurements of the vehicle interior or exterior. The accuracy of the measurements recorded by such digitizers is not as high as desired. Moreover, the manual manipulation is burdensome.

The prior art has not successfully addressed these problems. Thus, there has been a need for an improved system which allows designers to create a vehicle model. There has also been a need for an improved method of constructing a vehicle model which facilitates modifying the design of a vehicle interior or exterior. Finally, there has also been a need for an improved system for using a digitizer.

SUMMARY OF THE INVENTION

The model vehicle of the present invention includes a plurality of modular members arranged on a base for defining an interior and/or exterior of the vehicle. The interior surface of the model vehicle assembly closely approximates the design contour of a vehicle interior. Likewise, if the model includes the outer surface, it will also closely approximate the contour of a vehicle exterior. The modular members of the model vehicle are arranged on a base in a closely fitting, removable fashion. Each of the modular members provides a portion of a contoured surface which closely approximates a corresponding portion of the contour of the vehicle interior or exterior. Thus, if a designer wishes to change the contour of a portion of the vehicle design, only those modular members affected by the desired changes of the designer are removed and reconfigured. That is, the entire model vehicle does not need to be reconstructed as required by the prior art. As an example, should a designer study a seating buck and determine that the wheel well needs to be reconfigured, only the wheel well block need be removed.

In a preferred embodiment of the present invention, the modular members include an opposed flat surface which provides a reference surface for forming or reconfiguring the contoured surface. The invention starts each modular member as a block of a high density foam. A computer-controlled cutting machine includes a base. A flat face of the block rests on the base. The flat face becomes a reference surface or plane for the cutting machine. With this reference surface the machine can closely cut the desired interior surface. Later, if a designer decides a modular member requires reconfiguring, only that modular member is removed. The reference surface is again placed on a flat support surface with the contoured surface of the modular member facing away from the flat support surface. The contoured surface of the modular member may then be reconfigured according to the new design. Reconfiguration is also performed by a computer-controlled cutting machine. After reconfiguration, the modular member is replaced in the model vehicle in its original position. This invention thus reduces the set up time for reconfiguration, and greatly reduces the cost and the time delay due to a design change.

In another aspect of the invention, the modular model vehicle assembly includes a plurality of floor modular members mounted on the base. At least one of the floor modular members has a mount hole defining a reference point. A digitizer is mounted in the mount hole for measuring the dimensions of the inner surfaces of the modular members. The digitizer has an arm which extends to the inner surface of the seating buck assembly, and transmits the data corresponding to the contour of the inner surface of the seating buck assembly to a controller, such as a computer. The digitizer itself forms no portion of this invention. Instead, it is the reference mount which is inventive. This is particularly valuable in seating buck applications.

In a method according to the present invention, a seating buck assembly is initially constructed having a contoured inner surface which approximates a designed contour of a vehicle interior. The seating buck is then utilized to form a plastic model of the vehicle body. First, a master plug is formed using the seating buck assembly as a mold for a molding material. The outer surface of the master plug matches the contour of the inner surface of the seating buck assembly. A trim panel is then formed over the outer surface of a master plug. The trim panel thus duplicates the contoured inner surface of the seating buck assembly. An inner panel is then formed over the trim panel, thereby providing a vehicle model having a contoured interior surface which duplicates the contoured inner surface of the seating buck assembly. Thus, the seating buck facilitates the manufacture of other model types.

These and other features of the present invention will be best understood from the following specification and drawings, of which the following is a brief description.

BRIEF DESCRIPTION OF THE DRAWINGS

FIG. 6 is a cross-sectional view of a master plug formed from a seating buck assembly according to a process of the present invention.

FIG. 7 is a cross-sectional view of a section of the master plug with a trim panel formed over a surface thereof according to a process of the present invention.

FIG. 8 is a cross-sectional view of the section of the master plug with an inner panel formed over the trim panel according to a process of the present invention.

FIG. 9 is a cross-sectional view of the master plug with a outer panel formed over the inner panel according to a process of the present invention.

FIG. 10 is a partial cross-sectional view of a model vehicle formed over the master plug according to a process of the present invention.

DETAILED DESCRIPTION OF A PREFERRED EMBODIMENT OF THE INVENTION

Referring to the figures, a model vehicle is generally shown at 20. Although a seating back is illustrated it should be understood that this invention extends to other types of vehicle models. The seating buck assembly 20 is particularly adapted to assist designers of vehicle interiors in designing the dimensions of the interior to accommodate components such as seats, armrests, steering column, etc. in or on a vehicle. The seating buck assembly 20 includes a contoured inner surface which closely approximates the designed vehicle interior. The seating buck is utilized by the designer to test the design dimensions of the vehicle interior. As an example, the designer may find that a design height or distance that appeared acceptable in a computer, in fact is too small to be acceptable. By providing an actual full scale model of the vehicle interior, the designer is able to test the practicality of the particular design dimensions. The seating buck assembly 20 has a base 22 which provides a support for the seating buck assembly 20. The seating buck assembly also includes a plurality of modular members 24, 26, 28 which are arranged on base 22. The modular members 24, 26, 28 collectively define an interior or exterior of a vehicle.

Figure 1:
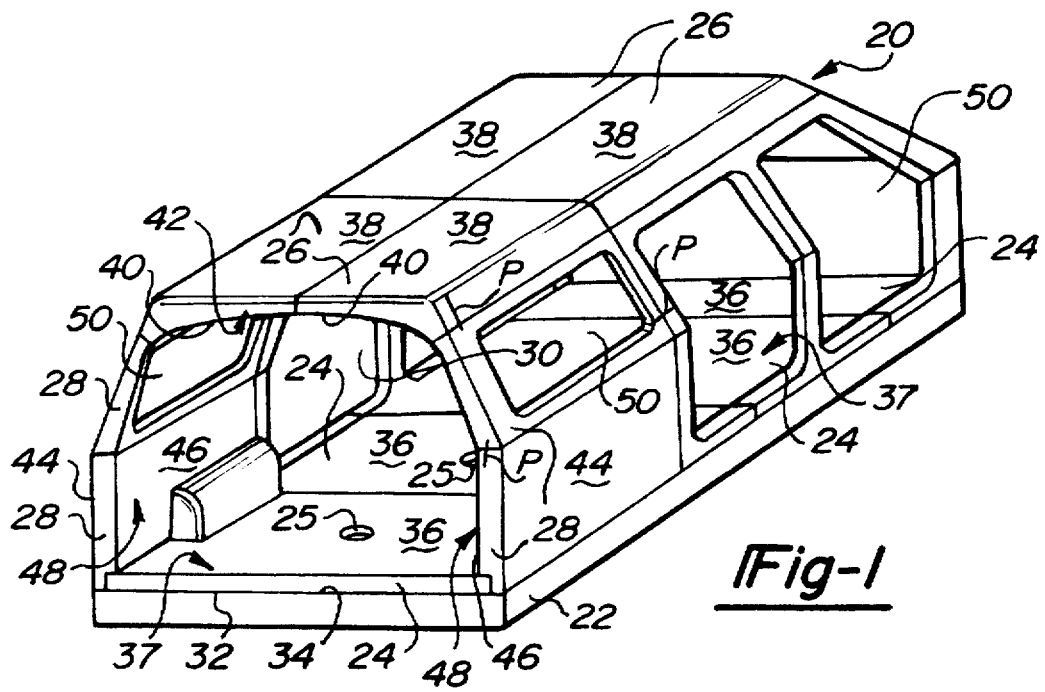
FIG. 1 is a perspective view of a seating buck assembly in accordance with the present invention.

In the seating buck assembly 20 shown in FIG. 1, modular members 24, 26, 28 define an interior 30 of a vehicle. Modular members 24, 26, 28 may also be constructed to define both a vehicle interior and exterior as explained below. Each modular member 24, 26, 28 has a planar reference surface and an opposing contoured surface which closely approximates a portion of the vehicle interior 30. The modular members of seating buck assembly 20 include floor modular members 24, roof modular members 26 and side panel modular members 28. Modular members 24, 26, 28 are preferably constructed of a high density foam. In fact, it is somewhat desirable to form the interior into many distinct modular members to facilitates reconfiguration. As an example, the roof supports which face into the passenger chamber we preferably formed as separate parts. Foam materials such as polyurethane are preferred because they can be molded and carved according to a manufacturer's specifications or a designers requirements. Densities on the order of 20 lb. per cubic foot are preferable.

Each floor modular member 24 has a flat reference surface 32 which abuts a top surface 34 of base 22. Each floor modular member 24 also has an opposing contoured surface 36 facing vehicle interior 30. Each contoured surface 36 closely approximates a portion of a floor 37 of the vehicle. Altogether, the surfaces 36 of floor modular members 24 approximate the contour of a floor 37 of the vehicle. One or more of floor modular members 24 may include a hole 25 which receives and supports a post for a digitizer, described in further detail below. Hole 25 may extend into base 22 to provide a more rigid and stable support for the post (see FIG. 4).

Likewise, roof modular members 26 each have a flat reference surface 38 and an opposing contoured surface 40 which closely approximates a portion of the contour of a roof 42 of the vehicle. Together, the contoured surfaces 40 of roof modular members 26 approximate the contour of the roof 42 of the vehicle. Side modular members 28 also have a flat reference surface 44 and an opposing contoured surface 46 which closely approximates at least a portion of the contour of an inner side panel 48 of the vehicle. The modular side panel members 28 may include openings 50 representing a window or a door opening of a vehicle. The contoured surfaces 46 of members 28 jointly approximate the contour of inner side panel 48.

Collectively, contoured surfaces 36, 40, 46 of the modular members 24, 26, 28, respectively, approximate the contour of the vehicle interior 30. Again, there may be many other modular members in an actual seating buck. Modular members 24, 26, 28 are arranged on the base 22 such that each modular member 24, 26, 28 has at least one edge which abuts the edge of another modular member. The modular members 24, 26, 28 are removably positioned in the seating buck assembly in a close fitting, contiguous fashion. The seating buck assembly may include means for securement of a modular member to another modular member or the base 22, such as metal pins P or, screws, bolts, etc. Note pin P are preferably accessible from a location on an outer surface of each said modular member.

Now, should the designer determine that a portion of the design should be modified, the present invention facilitates that reconfiguration. In the prior art, it is quite difficult to reconfigure the seating buck. Since the prior art seating buck were formed as monolithic large panels, one could not simply reconfigure a small modular portion. Instead, the present invention is able to reconfigure its design by merely changing the modular portions that need to be modified. In fact, in most cases even the modular portion that need the reconfiguration need not be replaced, as explained below.

Figure 2:
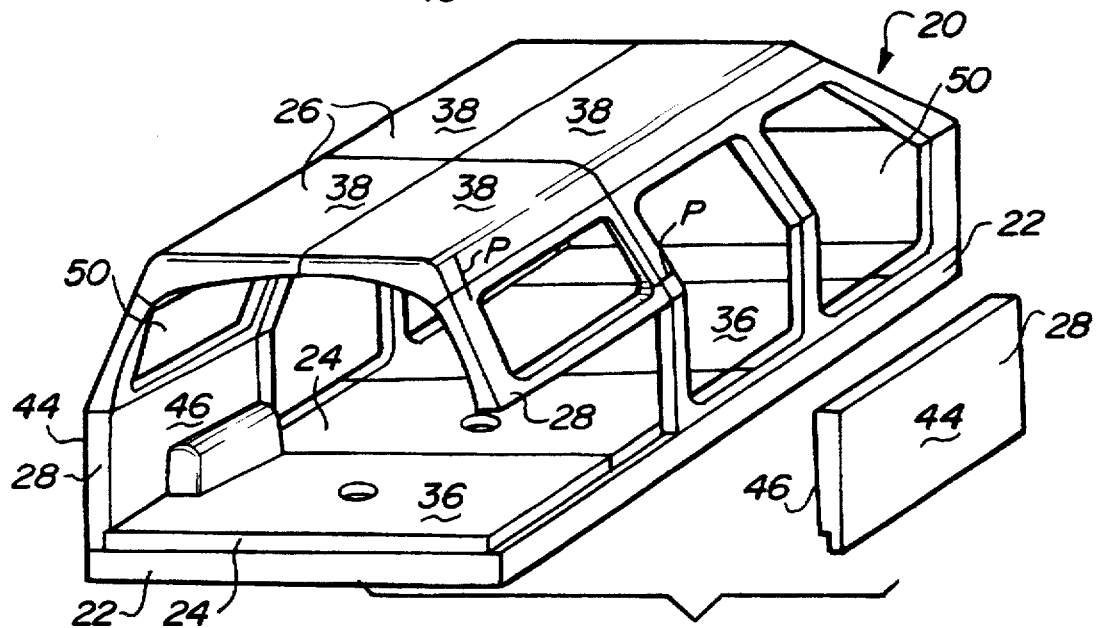
FIG. 2 is a perspective, assembly view of the seating buck assembly in accordance with the present invention.

As shown in FIG. 2, a side panel modular member 28 can be removed for reconfiguration. Such would be the case, for instance, if the designers of the vehicle interior 30 were not satisfied with the original contoured surface of a modular member, i.e., contoured surface 46 of modular member 28 in FIG. 2. For example, a designer may find that having put the components of a vehicle interior in the seating buck assembly 20 (e.g., seats, steering column, steering wheel, armrests, etc.), the contour of a side panel modular member 28 needs to be altered in some fashion to better accommodate such components. The designer may remove side panel modular member 28 and reconfigure the contoured surface 46. Pins P are placed such that the other blocks still remain connected to the model.

Figure 3A:
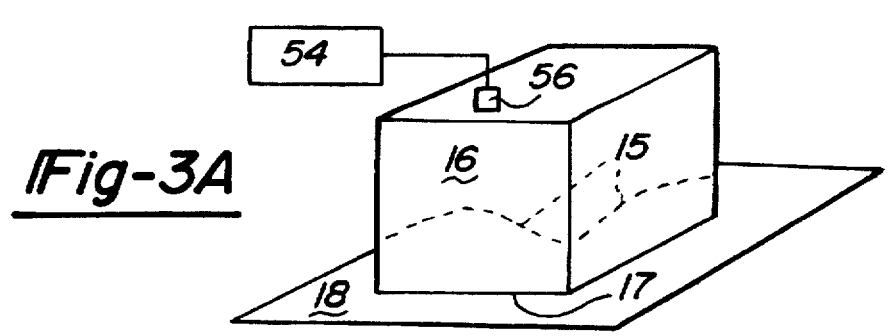
FIG. 3A is a perspective view of a first step in forming the modular components of this invention.

FIG. 3A shows how the modular members are originally formed. As shown in FIG. 3A, a block of foam 16 has one of its planar surfaces 17 placed on a planar base 18 of a cutting tool. The cutting tool is preferably a computer-controlled cutting tool with a control 54 controlling the tool 56. The control 54 is supplied with CAD information based on the desired design of the vehicle. Tool 56 is shown schematically in FIG. 3A. Since control 54 knows the location of the reference surface 17 (i.e., it is on planar base 18), it can transmit the design information to the cutting tool 56 such that cutting tool 56 is able to cut block 16 to the exact design dimension and contours of each of the modular panels. Thus, the present invention is able to closely achieve the desired design profile and contours by controlling the tool 56 to cut the block 16. A sample contour that is to be cut is shown by dotted line 15. The surface 17 remains as the reference surface 44.

Now, when the designer decides that one of the modular members must be reconfigured, the contour portion at issue is removed as mentioned above. That modular member is then reconfigured as shown with reference to FIG. 3B.

Figure 3B:
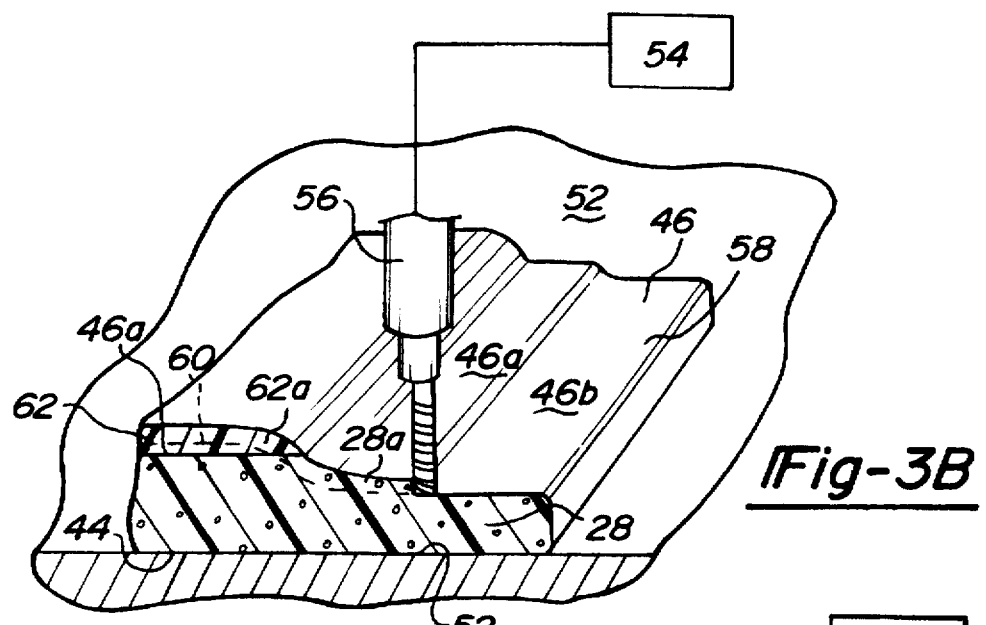
FIG. 3B is a perspective, partial view of a section of the seating buck assembly during reconfiguration in accordance with the present invention.

In FIG. 3B, side panel modular member 28 is shown on a support surface 52 with reference surface 44 overlaying and abutting support surface 52. Controller 54 is connected to and directs cutting tool 56, shown schematically, to reconfigure the shape of contoured surface 46. As shown in FIG. 3B, tool 56 travels longitudinally over original contoured surface 46a, thereby cutting away a portion 28a of modular member 28, leaving new contoured surface 46b. Dotted line 60 represents the path tool 56 will travel to produce new contoured surface 46b of reconfigured modular member 28. Tool 56 may shave or cut away a portion 28a forming part of the original modular member 28. In some instances, however, additional material 62 (such as Bondo™ or other plastic body filler) may be applied over a portion of original contoured surface 46a where, for example, a designer wishes to change the contoured surface 46 of the modular member 28 such that the new contoured surface 46b extends further into vehicle interior 30. Thus, a portion 62a of additional material 62 is shaved or cut away from modular member 28 to produce contoured surface 46b. Once modular member 28 has been reconfigured, modular member 28 may be refitted into the seating buck assembly 20 providing a new contoured surface 46b patterned by the designer. The cutting shown in this Figure better illustrates the original cutting that occurs in the FIG. 3A formation.

Figure 3C:
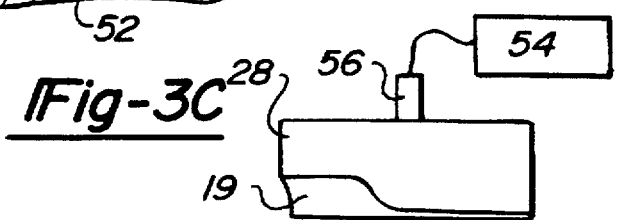
FIG. 3C is a side view showing yet another step in a method invention according to this application.

FIG. 3C shows the method of the present invention being utilized to form the outer contour onto the modular members, such as a modular member 28. As shown, a plug 19 is first formed by placing a molded material on the interior contour of the modular member 28. The plug has a controlled thickness. Now, plug 19 has a reference planar face which may rest on reference surface 18. The computer 54 will know the distance between the base 18 and the tool 56, and further between the interior contour and the tool 56. Thus, the tool 56 can be utilized based on the computer-aided design information stored in control 54 with regard to the desired exterior of the vehicle, and can thus cut the desired exterior of the vehicle into the modular member 28. Now, by utilizing this inventive method, a designer is able to quickly and inexpensively form an entire model vehicle having both accurately controlled interior and exterior surfaces. This helps the designer decide whether further reconfiguration of the exterior may be necessary. Upon reconfiguration of the exterior, the modular units can be removed and reconfigured as with the interior.

In summary, the inventive modular block allows a designer to quickly and inexpensively form a seating buck as shown in FIG. 1, or even an entire "body-in-white" as shown partially with reference to FIG. 3C. The engineer or designer is thus able to quickly and accurately test the workability and practicality of any design. The present invention also allows reconfiguration much quicker than with the prior art.

Figure 4:
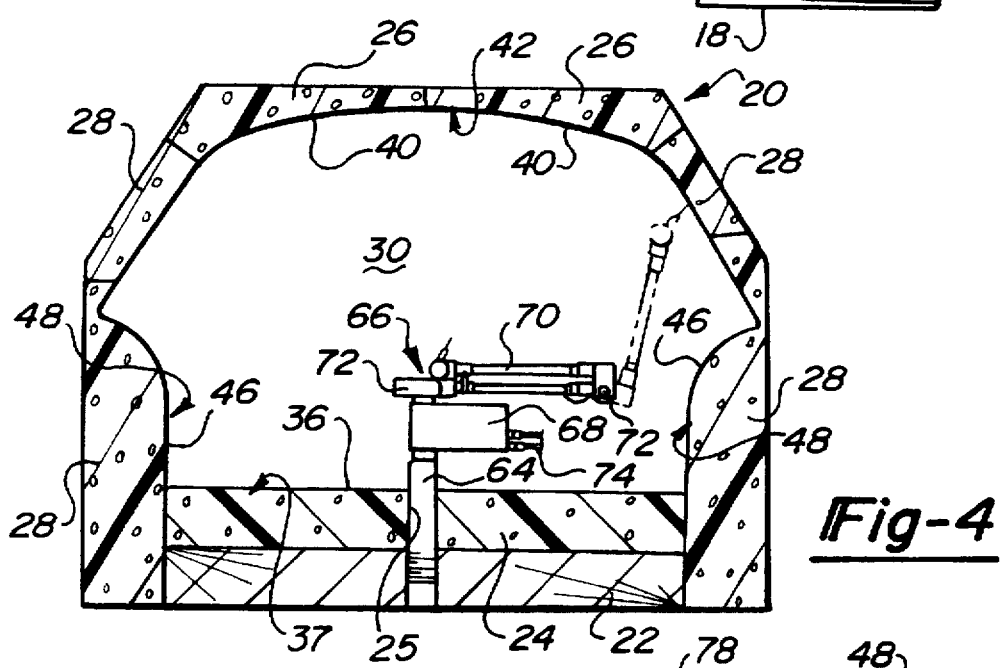
FIG. 4 is a cross-sectional view of the seating buck assembly with a digitizer in accordance with the present invention.

Another feature of this invention is shown in FIG. 4. A post 64 of a digitizer 66 sits in hole 25 and is supported by floor modular member 24. Digitizer 66 may be as known in the art. Digitizer 66 includes a digitizer base 68 which is supported by post 64 in the interior 30 of the seating buck assembly 20, and an arm 70, which is attached to digitizer base 68. Arm 70 pivots at pivot points 72, thus allowing the digitizer arm 70 to extend out to contoured surfaces 36, 40, 46 of modular members 24, 26, 28, respectively. With post 64 positioned in hole 25 of floor modular member 24, digitizer 66 measures the contour of the seating buck assembly interior 30 using the position of the post 64 in hole 25 as a reference point. As mentioned above, the accurate computer control of the formation of the blocks, and hole 25, allows the location of hole 25 to be known accurately. Digitizer arm 70 sweeps across the contoured surface 37, 42, 48 of the seating buck assembly interior 30, and data comprising this contour is transmitted through lines 74 to a controller such as a computer (not shown). This provides a more accurate reading of the contoured surface 37, 42, 48 of the interior 30 of the seating buck assembly.

Figure 5:
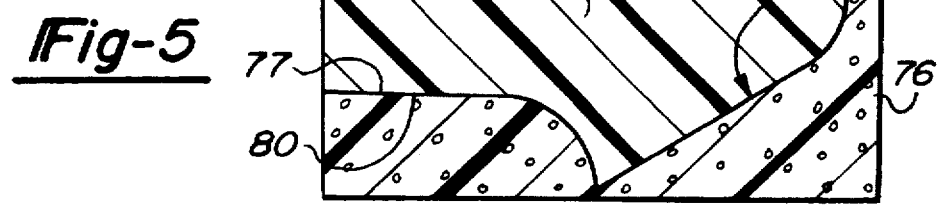
FIG. 5 is a cross-sectional view of a section of the seating buck assembly being used to form a master plug.

In FIGS. 5–9, a process of making a distinct type model vehicle is shown. As shown in FIG. 5, a portion of the seating buck assembly 76 corresponding to side panel modular members 28 is used for duplication of inner side panel contoured surface 46. This is accomplished by using seat buck assembly portion 76 as a mold having a mold surface 77 for forming a molded part 78. Molded part 78 comprises a molding material such as a thermoset or thermoplastic resin. Molded part 78 has a contoured surface 80 corresponding to contoured surface 46 of modular members 28. Likewise, the other modular members are used to form parts, such as molded part 82. Molded parts 78 and 82 are fastened together to form a master plug 84 having a contoured outer surface 80 which closely matches the inner contoured surface 37, 42, 48 of the seating buck assembly interior 30. In fact, all of the other modular blocks would be formed into similar parts to complete plug 84.

Once the plug is complete, it can be used to form prototype plastic parts. As shown in FIG. 7, a trim panel 86 is formed over molded part 78 by applying a relatively rigid material over surface 80 of molded part 78. For example, fiberglass material supplied by the Owens-Corning may be applied to the outer surface 80 of the master plug 84. Thus, trim panel 86 has a contoured surface 87 which closely matches contoured surface 80 and corresponding to contoured surface 48 of side panel modular members 28. Since the seating block itself is accurately formed, one can be confident that these parts closely match the design.

As shown in FIG. 8, an inner panel 88 is then formed over the trim panel 86. The process thus provides a very accurate formation of inner panel 88 on master plug 84. As such, sample plastic parts can be reproduced quickly and accurately using the master plug 84 formed from a seating buck assembly.

As shown in FIGS. 9 and 10, an outer panel 90 having an outer contoured surface 92 may be formed over inner panel 88. The outer surface can be cut from a greater amount of material. Here, the lower surface of the master plug forms the reference surface. The combined inner and outer panels are then useable as a body-in-white. This is a significant improvement over the prior methods.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. A method of forming a model of a vehicle comprising the steps of:
   1) placing a foam block on a cutting tool, said foam block having a reference surface such that said cutting tool can identify the distance between said reference surface and the working surface of the cutting tool;
   2) communicating computer design information to said cutting tool of a desired vehicle interior;
   3) cutting said foam block to achieve said desired vehicle interior contour;
   4) repeating steps 1) through 3) with a plurality of blocks, each of said blocks forming a different portion of a desired vehicle interior;
   5) then assembling said plurality of blocks to form a model vehicle; and said method including the further steps of evalulating the design of the interior of said vehicle after step 5) thereby determining whether any reconfiguration is necessary, and if reconfiguration of a particular modular block is desired, removing the particular block, and reconfiguring that block as necessary to achieve a new reconfigured design.

2. A method as recited in claim 1, wherein plastic filler material is placed on said block prior to said reconfiguration, if it is desired to have additional material in said reconfiguration.

3. A method as recited in claim 1, wherein said foam blocks are formed of a high density foam.

4. A method as recited in claim 1, further including the steps of placing said block on a reference surface such that a face of said foam block opposed to said vehicle interior contour surface is now exposed to said cutting tool, and cutting a desired vehicle exterior into said opposed surface.

5. A method as recited in claim 1, wherein a reference mount is formed in one of said modular blocks, and a digitizing tool is placed in said reference mount, said digitizing tool being utilized to check the contours and dimensions of said vehicle interior.

6. A method as recited in claim 1, wherein said foam blocks are utilized to form a master plug to be utilized to form other vehicle model components.

* * * * *